United States Patent
Shi et al.

[19]

[11] Patent Number: 5,875,296
[45] Date of Patent: Feb. 23, 1999

[54] DISTRIBUTED FILE SYSTEM WEB SERVER USER AUTHENTICATION WITH COOKIES

[75] Inventors: Shaw-Ben Shi; Michael Bradford Ault, both of Austin; Ernst Robert Plassmann, Pflugerville; Bruce Arland Rich, Round Rock; Mickella Ann Rosiles, Austin; Theodore Jack London Shrader, Cedar Park, all of Tex.

[73] Assignee: International Business Machines Corporation, Armonk, N.Y.

[21] Appl. No.: 790,041

[22] Filed: Jan. 28, 1997

[51] Int. Cl.$^6$ .................................................. G06F 11/00
[52] U.S. Cl. .............................. 395/188.01; 395/188.01; 395/200.54
[58] Field of Search ............................... 395/186, 187.01, 395/188.01, 200.59, 200.33, 200.54, 200.47, 200.48, 200.49; 380/4, 24, 49

[56] References Cited

U.S. PATENT DOCUMENTS

| | | | |
|---|---|---|---|
| 4,578,531 | 3/1986 | Everhart et al. | 380/21 |
| 5,187,790 | 2/1993 | East et al. . | |
| 5,491,752 | 2/1996 | Kaufman et al. | 380/30 |
| 5,497,463 | 3/1996 | Stein et al. | 200/200.33 |
| 5,530,852 | 6/1996 | Meske, Jr. et al. | 395/200.36 |
| 5,572,643 | 11/1996 | Judson | 395/200.48 |
| 5,644,711 | 7/1997 | Murphy | 395/188.01 |
| 5,678,041 | 10/1997 | Baker et al. | 395/188.01 |
| 5,708,780 | 1/1998 | Levergood et al. . | |
| 5,734,831 | 3/1998 | Sanders | 395/200.53 |
| 5,796,952 | 8/1998 | Davis et al. | 395/200.54 |

*Primary Examiner*—Robert W. Beausoliel, Jr.
*Assistant Examiner*—Pierre E. Elisca
*Attorney, Agent, or Firm*—Jeffrey S. LaBaw; David H. Judson

[57] ABSTRACT

A method of authenticating a Web client to a Web server connectable to a distributed file system of a distributed computing environment. The distributed computing environment includes a security service for returning a credential to a user authenticated to access the distributed file system. In response to receipt by the Web server of a user id and password from the Web client, a login protocol is executed with the security service. If the user can be authenticated, a credential is stored in a database of credentials associated with authenticated users. The Web server then returns to the Web client a persistent client state object having a unique identifier therein. This object, sometimes referred to as a cookie, is then used to enable the Web client to browse Web documents in the distributed file system. In particular, when the Web client desires to make a subsequest request to the distributed file system, the persistent client state object including the identifier is used in lieu of the user's id and password, which makes the session much more secure. In this operation, the cookie identifier is used as a pointer into the credential storage table, and the credential is then retrieved and used to facilitate multiple file accessess from the distributed file system. At the same time, the Web client may obtain access to Web server (as opposed to distributed file system) documents via conventional user id and password in an HTTP request.

20 Claims, 3 Drawing Sheets

DISTRIBUTED FILE SYSTEM WEB SERVER USER AUTHENTICATION WITH COOKIES

TECHNICAL FIELD

The present invention relates generally to Web transaction processing and more particularly to enabling access to Web documents stored in a secure distributed file system.

BACKGROUND OF THE INVENTION

The World Wide Web of the Internet is the most successful distributed application in the history of computing. In the Web environment, client machines effect transactions to Web servers use the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and receives in return a document formatted according to HTML.

Many organizations use multiple computers interconnected into a distributed computing environment in which users access distributed resources and process applications. A known distributed computing environment, called DCE, has been implemented using software available from the Open Systems Foundation (OSF). As DCE environments become the enterprise solution of choice, many applications may be utilized to provide distributed services such as data sharing, printing services and database access. OSF DCE includes a distributed file system, called Distributed File Services (DFS), for use in these environments.

DFS provides many advantages over a standalone file server, such as higher availability of data and resources, the ability to share information throughout a very large-scale system, and protection of information by the robust DCE security mechanism. In particular, DFS makes files highly available through replication, making it possible to access a copy of a file if one of the machines where the file is located goes down. DFS also brings together all of the files stored in various file systems in a global namespace. Multiple servers can export their file system to this namespace. All DFS users, in the meantime, share this namespace, making all DFS files readily available from any DFS client machine.

It would be highly desirable to extend the functionality of existing standalone Web servers in the enterprise environment to take advantage of the scalability, file availability and security features of DFS (or other similar distributed file systems). As a by-product, users with an off-the-shelf browser would be able to easily access the Web information stored in the DFS namespace with no additional software on the client machine. Before this goal can be achieved, however, it is necessary to integratethe security mechanism provided by the Web Server with conventional DFS security. One of the alternatives is to use the Basic Authentication scheme (provided by the Web server) to obtain the userid and password for each HTTP request. However, using the known basic authentication scheme in the context of DFS has several problesm.

In particular, user ids and passwords are passed on every request. Thus, they are more likely to be attacked by intruders even if passwords are protected by some encryption mechanism (for example, SSL). Secondly, it is difficult for the DFS and Web server security mechanisms to coexist. The browsers will memorize the userid and password sent to a specific server and the id and password will be attached to every HTTP request sent to that server. If a mechanism is provided for having the Web server access the distributed file system, the Web server will maintain both the documents stored on the server local directory (protected by Web server security) and DFS (protected by DFS security). From the browser's perspective, the Web server is a single server and will only remember one pair of userid and password for the Web server. If a user is browsing both DFS documents and Web server documents, he or she will be prompted for userid and password every time there is a switch from DFS document to Web server document, and vice versa. Finally, only limited error information can be returned to the user when DFS authentication fails.

These problems make the known basic authentication scheme ill-suited for integrating Web server and DFS security mechanisms.

The present invention solves this problem.

BRIEF SUMMARY OF THE INVENTION

It is thus a primary goal of the present invention to authenticate users accessing a distributed file system through an Internet World Wide Web server.

It is a further object of the invention to provide a distributed file system authentication scheme for Web browsing that only requires passing of a user id and password when the user initially logs in to the file system through a Web server. On subsequent requests, a secret handle stored in a "cookie" is passed from the Web browser to the Web server.

It is thus another object of the invention to use a persistent client state HTTP cookie authentication scheme to facilitate secure Web document access from a distributed file system.

It is yet another object of the invention to implement a cookie-based authentication scheme for DFS Web server applications that coexists with the basic authentication security scheme known in the art such that when a user switches from a DFS document to a Web server document, he or she will not be prompted for user id and password if alreadly logged into DFS.

It is still another object of the invention to provide for customized error messages to be passed from the Web server to the browser instead of the error messages provided by the known basic authentication scheme.

It is a more general object of the invention to integrate the security mechanism provided by the Web Server with conventional DFS security. This will enable the functionality of existing standalone Web servers to be enhance in the enterprise environment to take advantage of the scalability, file availability and security features of DFS (or other similar distributed file systems). As a by-product, users with an off-the-shelf browser will be able to easily access the Web information stored in the DFS namespace with no additional software on the client machine.

These and other objects of the invention are provided in a method of authenticating a Web client to a Web server connectable to a distributed file system of a distributed computing environment. The distributed computing environment includes a security service for returning a credential to a user authenticated to access the distributed file system. In response to receipt by the Web server of a user id and password from the Web client, a login protocol is executed with the security service. If the user can be authenticated, a credential is stored in an in-memory credential database of credentials associated with authenticated users. The Web server then returns to the Web client a persistent client state object having a unique identifier therein. This object, sometimes referred to as a cookie, is then used to enable the Web client to browse Web documents in the distributed file system. In particular, when the Web client desires to make a subsequest request to the distributed file system, the persistent client state object including the identifier is used in lieu of the user's id and password, which makes the session much more secure. In this operation, the cookie identifier is used as a pointer into the in-memory credential database, and the credential is then retrieved and used to facilitate multiple file accessess from the distributed file system.

At the same time, the Web client may still obtain access to Web server (as opposed to distributed file system) documents via conventional user id and password in an HTTP request. Thus, the inventive authentication scheme may coexist with basic authentication now in common use.

According to a preferred method of the present invention, and responsive to an initial HTTP request, a determination is first made regarding whether the Web client has a browser that supports persistent client state objects or "cookies". If so, the Web server sends the Web client a login HTML form and a first cookie including a URL identified by the HTTP request. The user is then prompted to complete the HTML form with his or her user id and password. Thereafter, the Web client transmits the completed form along with the first cookie (including the URL entry) back to the Web server. At the server, information from the completed form is extracted and supplied to a login protocol for the distributed file system. If the login is successful, a user credential is created and stored, preferably in an in-memory credentials database. If the login is not successful, an error message is returned to the Web client. Then, a unique identifier is generated for the authenticated user and used as a pointer to the credentials database. This identifier is then placed in a new cookie that is sent to the Web client. The new cookie is then used by the Web client for any subsequent file accesses to the distributed file system. By using the new cookie, the Web client need not transfer repeatedly the user's id and password over the network. However, the client can still use the user id and password to obtain simple file access from the Web server (as opposed to the distributed file system).

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
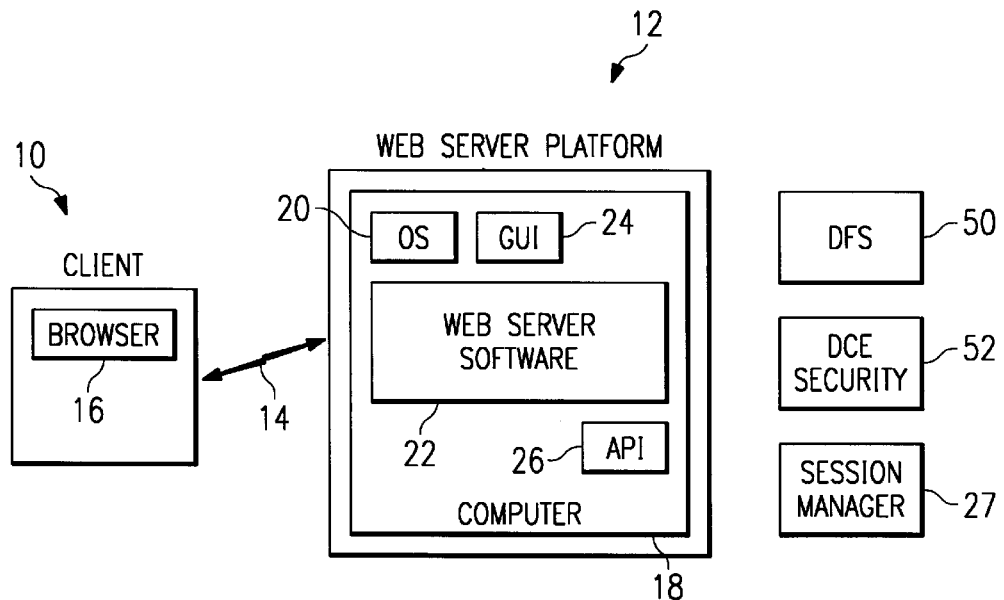
FIG. 1 is a representative system in which the plug-in of the present invention is implemented.

A representative system in which the present invention is implemented is illustrated in FIG. 1. A client machine 10 is connected to a Web server platform 12 via a communication channel 14. For illustrative purposes, channel 14 is the Internet, an Intranet or other known connection. In the case of the Internet, Web server platform 12 is one of a plurality of servers which are accessible by clients, one of which is illustrated by machine 10. A client machine includes a browser 16, which is a known software tool used to access the servers of the network. By way of example only, a client machine is a personal computer. Representative browsers include, among others, Netscape Navigator (all versions), Microsoft Internet Explorer (all versions) or the like, each of which are "off-the-shelf" or downloadable software programs. The Web server platform (sometimes referred to as a "Web" site) supports files in the form of hypertext documents and objects. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an IBM RISC System/6000 computer 18 (a reduced instruction set of so-called RISC-based workstation) running the AIX (Advanced Interactive Executive Version 4.1 and above) Operating System 20 and a Web server program 22, such as Netscape Enterprise Version 2.0, that supports interface extensions. The platform 12 also includes a graphical user interface (GUI) 24 for management and administration. The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/web server combinations may be used.

Figure 2:
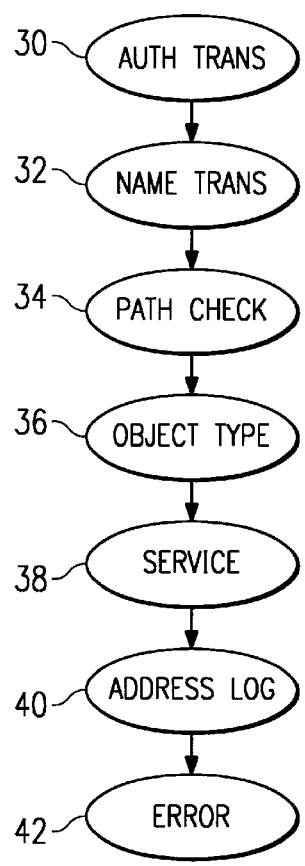
FIG. 2 is a flowchart of server side operations of a conventional Web transaction in response to receipt of a request from a browser of a client machine.

The Web Server accepts a client request and returns a response. The operation of the server 18 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.)

for the given document is identified. At step 38, called Service (Service), the Web server routine selects an internal server function to send the result back to the client via a normal server-service routine. The particular function selected depends on the nature of the request. At step 40, called Add Log (AddLog), information about the transaction is recorded. At step 42, called Error, the server responds to the client when it encounters an error. Further details of these operations may be found in the Netscape *Web Server Programmer's Guide*, Chapter 5, which is incorporated herein by reference.

Thus, the Web server 18 includes a known set of server application functions (SAFs). These functions take the client's request and other configuration data of the server as input and return a response to the server as output. Referring back to FIG. 1, the Web server 18 also includes an Application Programming Interface (API) 24 that provides extensions to enable application developers to extend and/or customize the core functionality thereof (namely, the SAFS) through software programs commonly referred to as "plug-ins." The present invention makes use of the server API 20 to provide for a plug-in that facilitates user authentication so that users of client machines may use browsers to enable Web access to documents on a distributed file system 50.

In particular, according to a general object of the present invention, it is desired to enable the user of the client machine 10 (intentionally or unknowingly) to use the (preferably) off-the-shelf browser 16 to access, browse and retrieve documents located in the distributed file system 50. One such file system 50 is Distributed File Services (DFS), which is a known distributed file system implemented in a networked environment called the Distributed Computing Environment (DCE). DCE has been implemented using software available from the Open Systems Foundation (OSF). In a distributed computing environment, a group of machines is typically referred to as a "domain." An OSF DCE domain is called a "cell." A DCE cell may be a complex environment involving hundreds of machines in many locations.

DCE DFS 50 provides data sharing services by making use of remote procedure calls (RPC's) for naming, and a DCE Security Service 52 for authentication services. DFS 50 interfaces to the DCE Security Service 52 via the session manager process 27, as described in more detail in copending application Serial No. xx/xxx,xxx, assigned to the assignee of this invention. In addition to its use of DCE Services, DFS itself is rich in features. It provides a uniform global filespace which allows all DFS client users to see the same view of the filespace, and it caches filesystem data at the client for improved scalability and performance by reducing network traffic to file servers. DFS also supports advisory file locking, and one of its features in the ability to export the operating system's native filesystem. For example, in the case of the AIX Operating System, the native filesystem is the Journaled File System (JFS). In addition, DFS also provides its own physical filesystem, the DCE Local File System (LFS). The DCE LFS provides supports for DCE Access Control Lists (ACL's) on files and directories for securing access to data and advanced data management capabilities such as replication and load balancing.

DFS 16 uses so-called DCE Kerberos-based authentication. A unix "credential" is associated with each file operation and holds the local authentication information for that operation. In particular, a credential is a data structure defining a particular machine (or a user on a multi-user machine). From the local operating system's point-of-view, the credential includes a user id, a group id, optionally a list of operating system privileges, and an authentication identifier known as a PAG (Process Authentication Group). The PAG acts as a tag for associating "tickets" between DFS 50 and the DCE Security Server 52. When DFS users authenticate via the DCE Login facility, known as dce_login, the DCE Security Service interacts with DFS (across the network) through a setpago) interface to establish the PAG/ticket relationship in the process's credential. On filesystem requests, DFS extracts the PAG from the credential structure to establish the DCE user's authentication for RPC requests to the DFS fileserver.

Figure 3:
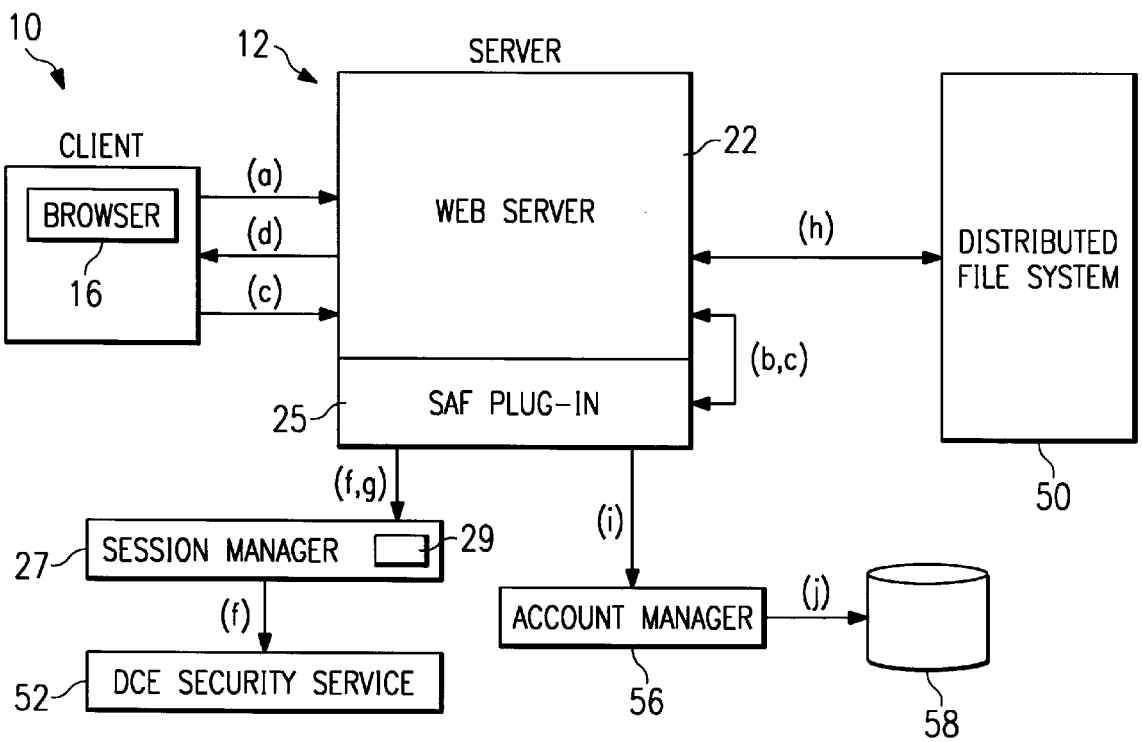
FIG. 3 is a process flow diagram illustrating a Web transaction implemented according to the teachings of the present invention.

The control flow associated with the invention is illustrated in the process flow diagram of FIG. 3. This figures illustrates the basic system of FIG. 1, with the inclusion of an account manager 56 having an associated database 58. Session manager 27 starts up upon initialization of the Web server and is preferably run by the workstation computer 18. It includes its own storage area 29. When the client 10 (through the browser 16) requests a DFS document (step a), the Web server 18 invokes a server path check (using the SAF plug-in 25)(step b). The PathCheck checks with the session manager 27 to determine whether the user has appropriate DCE credentials. If not (step c), the SAF plug-in 25 will return an error message (e.g., "401; Unauthorized") to the browser 16 (step d) and prompt the user for user id and password. After getting the userid and password from the user (step e), the SAF plug-in invokes the session manager 27 (step f) to obtain the DCE credential for the user. Session manager 27 returns the DCE credential to the Web server (step g). The server then uses this user credential to represent the user to retrieve documents stored in DFS 50 (step h). After retrieving the documents, the account manager 56 is invoked (preferably using another API plug-in)(step i) to save appropriate usage information into the database 58 (step j).

The session manager 27 is thus invoked by the Web Server when a user attempts to access a DFS file. If a user has already been authenticated by DCE, the Session Manager 54 returns the user credential to the server, which uses this credential to retrieve DFS documents on behalf of the user. If not, the Session Manager 54 will login for the user and obtain the credential from DCE Security. The Session Manager maintains an in-memory database to keep track of which user has logged in so that a user may access multiple DFS pages.

Instead of using the basic authentication scheme, the present invention uses Persistent Client State HTTP cookies. Cookies are a known Internet mechanism which server-side connections (such as CGI scripts) can use to both store and retrieve information on the client side of the connection. A server, when returning an HTTP object to a client, may also send a piece of state information which the client will store. Typically, the state object, called a "cookie," may include a description of the range of URLs for which that state is valid. According to the Persistent Client State HTTP Cookies Preliminary Specification, which may be viewed at netscape.com at the path "/newref/std/cookie_spec_html," a cookie is introduced to the client by including a Set-Cookie header as part of an HTTP response, usually through a CGI script. Known cookie syntax is set forth below:

Syntax of the Set-cookie HTTP Response Header

This is the format a CGI script to add to the HTTP headers a new piece of data which is to be stored by the client for later retrieval.

```
Set-Cookie: NAME-VALUE; expires=DATE;
path=PATH; domain=DOMAIN_NAME; secure
NAME=VALUE
```

This string is a sequence of characters excluding semi-colon, comma and white space. If there is a need to place such data in the name or value, some encoding method such as URL style%XX encoding is recommended, though no encoding is defined or required.

This is the only required attribute on the Set-Cookie header.

```
expires=DATE
```

The expires attribute specifies a date string that defines the valid life time of that cookie. Once the expiration date has been reached, the cookie will no longer be stored or given out.

The date string is formatted as

```
Wdy, DD-Mon-YYY HH:MM:SS GMT
domain=DOMAIN_NAME
```

When searching the cookie list for a valid cookie, a comparison of the domain attributes of the cookie is made with the Internet domain name of the host from which the URL will be fetched. If there is a tail match, then the cookie will go through path matching to see if it should be sent. "Tail matching" means that domain attribute is matched against the tail of the fully qualified domain name of the host. A domain attribute of "acme.com" would match host names "anvil.acme.com" as well as "shipping.crate.acme.com".

Only hosts within the specified domain can set a cookie for a domain and domains must have at least two (2) or three (3) periods in them to prevent domains of the form: ".com", ".edu", and "va.us". Any domain that falls within one of the seven special top level domains listed below only require two periods. Any other domain requires at least three. The seven special top level domains are: "COM", "EDU", "NET", "ORG", "GOV", "MIL", AND "INT".

The default value of domain is the host name of the server which generated the cookie response.

```
path=PATH
```

The path attribute is used to specify the subset of URLs in a domain for which the cookie is valid. If a cookie has already passed domain matching, then the pathname component of the URL is compared with the path attribute, and if there is a match, the cookie is considered valid and is sent along with the URL request. The path "/foo" would match "/foobar" and "/foo/bar.html". The path "/" is the most general path.

If the path is not specified, it as assumed to be the same path as the document being described by the header which contain the cookie.

```
secure
```

If a cookie is marked secure, it will only be transmitted if the communications channel with the host is a secure one. Currently this means that secure cookies will only be sent to HTTPS (HTTP over SSL) servers.

If secure is not specified, a cookie is considered safe to be sent in the clear over unsecured channels.

Syntax of the Cookie HTTP Request Header

When requesting a URL from an HTTP server, the browser will match the URL against all cookies and if any of them match, a line containing the name/value pairs of all matching cookies will be included in the HTTP request. Here is the format of that line:

```
Cookie: NAME1=OPAQUE_STRING 1;
NAME2=OPAQUE_STRING2
. . .
```

Figure 4:
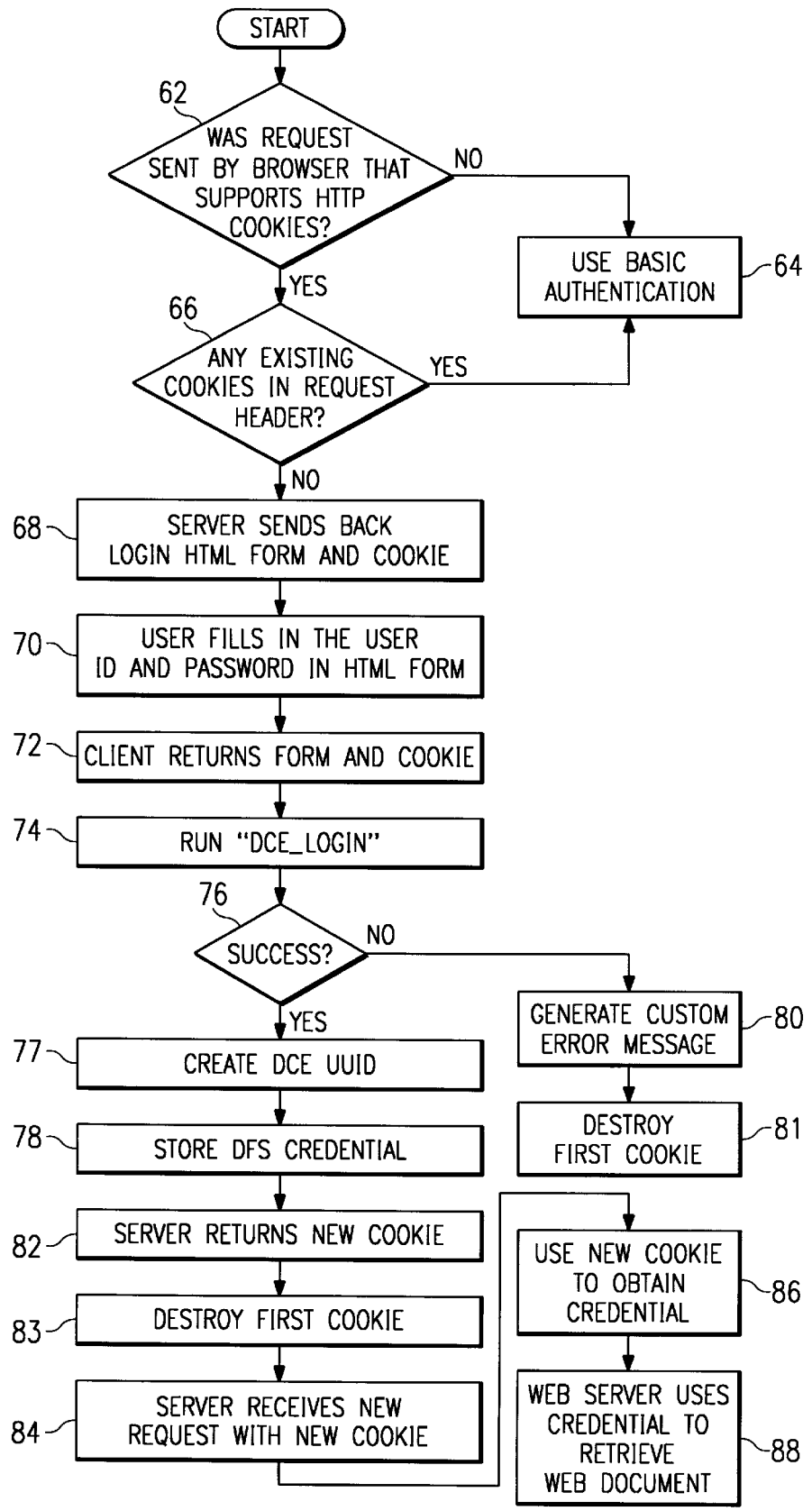
FIG. 4 is a detailed flowchart showing the process flow of the invention.

A flowchart showing the inventive authentication flow, which makes use of the HTTP cookies, is shown in FIG. 4. The routine starts at step 60 for each HTTP request received by the server. At step 62, a test is made to determine whether the request is sent by a browser that supports HTTP cookies. For example, the Netscape browser (e.g., Navigator (all versions)) and the Microsoft browser (e.g., Microsoft Internet Explorer (all versions) both support cookies, although other commercially-available browser programs do not. If the outcome of the test at step 62 is negative, basic authentication is then used to authenticate the user at step 64. If the outcome of the test at step 62 is positive (namely, that the browser supports cookies), the method continues at step 66 to test whether there are any existing cookies contained in the request header. If the outcome of the test at step 66 is positive, then the user has already been authenticated and basic authentication can be used. If the outcome of the test at step 66 is negative, the browser supports cookies but one does not yet exist.

At step 68, the server sends back a login HTML form to prompt the user for a user id and password. The server also sends back a cookie which includes as an entry the URL of the document requested by the user. In particular, as noted above, after the user if is authenticated by the DCE Security Server (via the session manager), the Web server needs to retrieve the document for the user. In this case, the Web server needs the original URL to retrieve the document. Since the Web server is stateless, the browser must be provided with the original URL. This is achieved by providing the cookie. At step 70, the user fills in the user id and password in the HTML form. The form itself is generated using a CGI script in a known manner. At step 72, the user id and password provided in the form are sent back to the server along with the cookie that the browser received in step 68.

Using the user id and password, the routine continues at step 74 to authenticate the user via the conventional dce_login mechanism. As is known in the art, running dce_login generates a "credential" for use by the user in obtaining access to DFS. If the authentication is not successful, as determined by a negative outcome at step 76, the server sends back a customized HTML document to the browser at step 80 describing the particular failure. Then, at step 81, the cookie created in step 68 is destroyed. If the authentication is successful, as determined by the test at step 76, the routine continues at step 77 to create a unique id (e.g., DCE UUID) for the user. At step 78, the DFS credential generated by the login (to the DCE Security Server) is stored in a database (preferably an in-memory storage) associated with the session manager and indexed by the unique id.

The routine continues at step 82 by sending back to the browser a new cookie, which includes the unique id created in step 76. Then, at step 83, the cookie created in step 68 is destroyed. The unique id, in effect, is a secret handle that is an entry into a table of credentials stored in the database associated with the session manager. On subsequent requests for service from the browser, the unique id (supported in the new cookie returned from the server to the browser in step 82) is used as a pointer to the user's DFS credential stored in this database. Thus, at step 84, the server receives a new request with the new cookie, which contain the unique id. At step 86, this unique id is used to obtain the credential for the user. At step 88, the credential is used (preferably by the Web server impersonating the browser) to retrieve the Web document supported in DFS.

Subsequent requests from the browser carry the cookie with the unique id and thus steps 84, 86 and 88 are repeated for all subsequent requests. Thus, according to the invention, it is only required to pass user id and password a single time, namely, when the user initially logs into DFS. Thereafter, a cookie with a unique id is passed on subsequent requests. The scheme can coexist with the basic authentication security scheme provided by the Web server. When a user switches from a DFS document to a Web server document, he or she will not be prompted for id and password again if already logged in through the DCE Security Service. Customized error messages may be passed back to the browser without being restricted to the error code specified in the basic authentication scheme.

One of the preferred implementations of the cookie-based authentication scheme of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web" client should be broadly construed to mean any computer or component thereof directly or indirectly connected or connectable in any known or later-developed manner to a computer network, such as the Internet. The term "Web" server should also be broadly construed to mean a computer, computer platform, an adjunct to a computer or platform, or any component thereof.

Further, although the invention has been described in terms of a preferred embodiment in a specific distributed file system environment, those skilled in the art will recognize that the invention can be practiced, with modification, in other and different hardware and operating system architectures with the spirit and scope of the appended claims. Thus, for example, while the present invention is preferably implemented to allow off-the-shelf browsers to access Web documents stored in DFS, the principles of the invention are equally applicable with other known architectures such as AFS (from which DFS was derived), as well as the Network File System (NFS) developed by Sun Microsystems. Moreover, implementation in OSF DCE is not a requirement of the present invention either.

Having thus described our invention, what we claim as new and desire to secure by Letters Patent is set forth in the following claims:

1. A method of authenticating a client to a Web server connectable to a distributed file system of a distributed computing environment, the distributed computing environment including a security service for returning a credential to a user authenticated to access the distributed file system, comprising the steps of:

(a) responsive to receipt by the Web server of a user id and password from the client, executing a login protocol with the security service and storing a credential resulting therefrom;

(b) returning to the client a persistent client state object having an identifier therein; and (c) having the client use the persistent client state object including the identifier in lieu of a user id and password to obtain subsequent access to Web documents in the distributed file system.

2. The method of authenticating as described in claim 1 wherein the identifier in the persistent client state object is used to retrieve the stored credential.

3. The method of authenticating as described in claim 1 wherein the user id and password are provided to the Web server in an HTML form.

4. The method of authenticating as described in claim 3 wherein the HTML form is completed by a user of the client.

5. A method of authenticating a Web client to a Web server connectable to a distributed file system of a distributed computing environment, the distributed computing environment including a security service for returning a credential to a user authenticated to access the distributed file system, comprising the steps of:

(a) for an HTTP request received by the Web server, determining whether the Web client has a browser that supports persistent client state objects;

(b) if the Web client has a browser that supports persistent client state objects, having the Web server sends the Web client a login HTML form and a first persistent client state object including a URL identified by the HTTP request;

(c) having the user complete the HTML form with user id and password;

(d) transmitting the completed form along with the first persistent client state object including the URL back to the Web server;

(e) extracting information from the completed form and executing a login protocol with the security service to generate a credential;

(f) returning to the Web client a second persistent client state object having an identifier therein; and (g) having the Web client use the second persistent client state object including the identifier in lieu of a user id and password to obtain subsequent access to Web documents in the distributed file system.

6. The method of authenticating as described in claim 5 wherein the identifier is used to access the credential.

7. A method of authenticating a Web client to a Web server connectable to a distributed file system of a distributed computing environment, the distributed computing environment including a security service for returning a credential to a user authenticated to access the distributed file system, comprising the steps of:

(a) responsive to receipt of a transaction request from the Web client, executing a login protocol with the security service to determine whether the Web client has access rights to the distributed file system;

(b) if the Web client does not have access rights to the distributed file system, returning an error message to the Web client;

(c) if the Web client does have access rights to the distributed file system, storing a credential resulting from the login protocol in a database of credentials associated with authenticated users;

(d) returning to the Web client a cookie having an identifier uniquely associated with the Web client; and (e) having the Web client use the cookie in lieu of a user id and password to obtain subsequent access to Web documents in the distributed file system.

8. The method of authenticating as described in claim 7 wherein the identifier in the cookie is used to retrieve the stored credential from the database.

9. A method of authenticating a Web client to a Web server connectable to a distributed file system of a distributed computing environment, the distributed computing environment including a security service for returning a credential to a user authenticated to access the distributed file system, comprising the steps of:

maintaining credentials of the users authenticated to access the distributed file system in a storage;

responsive to receipt from a Web client of a persistent client state object having an identifier therein, using the identifier to access one of the credentials in the storage; and using the credential to facilitate multiple file accesses in the distributed file system.

10. A computer program product for use in authenticating a Web client to a Web server connectable to a distributed file system of a distributed computing environment, the distributed computing environment including a security service for returning a credential to a user authenticated to access the distributed file system, the computer program product comprising:

a computer-readable storage medium having a substrate; and program data encoded in the substrate of the computer-readable storage medium, wherein the program data comprises:

means, responsive to receipt by the Web server of a user id and password from the Web client, for executing a login protocol with the security service and storing a credential resulting therefrom;

means for returning to the Web client a persistent client state object having an identifier therein; and means responsive to receipt of the persistent client state object including the identifier for controlling subsequent access to Web documents in the distributed file system.

11. The computer program product as described in claim 10 wherein the program data further includes means for generating error messages responsive to the login protocol.

12. The computer program product as described in claim 10 wherein the program data further includes means for establishing a store of the credentials of users authenticated to the distributed file system.

13. The computer program product as described in claim 10 wherein the persistent client state object is a cookie.

14. A computer program product for use in authenticating a Web client to a Web server connectable to a distributed file system of a distributed computing environment, the distributed computing environment including a security service for returning a credential to a user authenticated to access the distributed file system, the computer program product comprising:

a computer-readable storage medium having a substrate; and program data encoded in the substrate of the computer-readable storage medium, wherein the program data comprises:

means for maintaining a storage of the credentials of the users authenticated to access the distributed file system; and means, responsive to receipt from a Web client of a persistent client state object having an identifier therein, for using the identifier to access one of the credentials in the storage to facilitate access to documents in the distributed file system.

15. A computer connectable to a distributed computing environment including a security service for returning a credential to a user authenticated to access the distributed file system, comprising:

a processor;

an operating system;

a Web server program for providing World Wide Web information retrieval to Web clients connectable to the Web server program via a stateless computer network;

a server plug-in for authenticating Web clients to the Web server program, comprising:

means, responsive to receipt by the Web server of a user id and password from a Web client, for executing a login protocol with the security service and storing a credential resulting therefrom;

means for returning to the Web client a persistent client state object having an identifier therein; and means responsive to subsequent receipt of the persistent client state object including the identifier in lieu of a user id and password to control access to Web documents in the distributed file system.

16. The computer as described in claim 15 wherein the control means uses the identifier to access the credential.

17. A method of accessing documents from a Web server and a distributed file system to which the Web server is connected, the distributed file system supported in a distributed computing environment having a security service for returning a credential to a user authenticated to access the distributed file system, the method comprising the steps of:

(a) responsive to receipt by the Web server of a user id and password from the Web client, executing a login protocol with the security service and storing a credential resulting therefrom;

(b) returning to the Web client a persistent client state object having an identifier therein;

(c) having the Web client use the persistent client state object including the identifier in lieu of a user id and password to obtain access to Web documents in the distributed file system; and (d) having the Web client use the user id and password to obtain access to Web documents in the Web server.

18. The method as described in claim 17 further including maintaining a storage of the credentials of the users authenticated to use the distributed file system.

19. The method as described in claim 18 wherein the identifier is used to retrieve a credential from the storage.

20. The method as described in claim 17 further including the step of providing a custom error message from the Web server to the Web client if the login protocol is unsuccessful.

* * * * *